Figure 1:
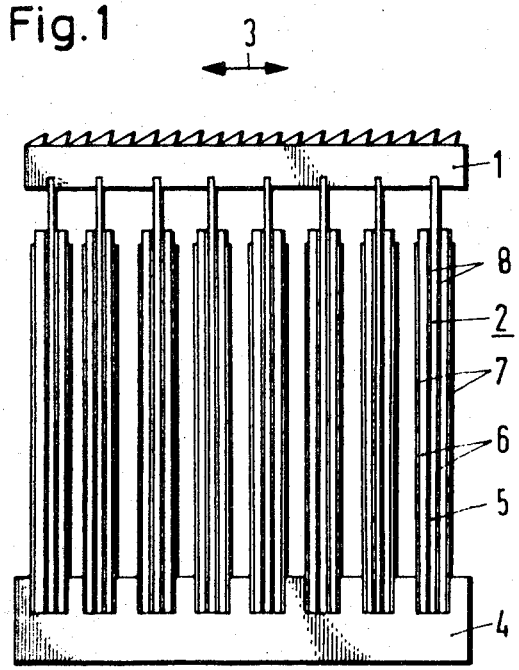

United States Patent [19]
Cobarg et al.

[11] 3,748,503
[45] July 24, 1973

[54] PIEZO ELECTRIC MOTOR

[75] Inventors: Christian Cobarg, Steinbach; Erich Fenner, Gauting; Max Guntersdorfer, Munich; Walter Heywang, Neukeferloh; Franz Otto, Munich; Rudolf Schofer, Ebersberg; Helmut Thomann, Munich, all of Germany

[73] Assignees: Braun AG; Siemens Aktiengesellschaft, both of Berlin and Munich, Germany; a part interest

[22] Filed: Sept. 10, 1971

[21] Appl. No.: 179,449

[30] Foreign Application Priority Data
Sept. 11, 1970 Germany.................. P 20 45 108.5
Sept. 11, 1970 Germany.................. P 20 45 152.9

[52] U.S. Cl..................... 310/8.6, 310/9.1, 310/9.5, 310/9.8
[51] Int. Cl............................................. H01v 7/00
[58] Field of Search............310/8–8.3, 8.5, 8.6, 9.1, 310/9.4, 21, 22, 26, 9.5, 9.8

[56] References Cited
UNITED STATES PATENTS
2,194,539  3/1940   Barry et al. ........................ 310/9.8
2,325,238  7/1943   Flint.................. 310/8.6 X
2,863,076  12/1958  Koren et al. ...................... 310/9.8 X
3,004,176  10/1961  Mason ................... 310/9.8 X
2,325,238  7/1943   Flint.................. 310/8.6 X
2,594,841  4/1952   Arndt, Jr. ......................... 310/8.6 X
3,146,367  8/1964   McKaney...................... 310/8.6 X
3,445,843  5/1969   Pena ..................... 310/8.6 X
3,225,226  12/1965  Kawakami ........................... 310/8.6
3,504,206  3/1970   Fritsch............................. 310/8.3 X
3,297,889  1/1967   Breskend ........................ 310/8.6 X
2,659,829  11/1953  Baerwald................... 310/8.5
3,409,377  11/1968  Rogallo............................. 310/8.6 X
3,166,683  1/1965   Gootherts ..................... 310/8.6
3,181,016  4/1965   Rosenman ....................... 310/8.6 X
3,067,345  12/1962  Harris..........................: 310/8.6

Primary Examiner—J. D. Miller
Assistant Examiner—Mark O. Budd
Attorney—Carlton Hill, Donald J. Simpson and Marvin Moody et al.

[57] ABSTRACT

A piezo electric motor having a reciprocating mechanical output driven by a bank of piezo ceramic bending strips, one end of each bending strip being secured in a stationary bed and the other end of each bending strip being connected to a driven member which is reciprocated by the repeated flexing of the bending strips.

4 Claims, 6 Drawing Figures

PATENTED JUL 24 1973 3,748,503

SHEET 1 OF 2

INVENTORS
Christian Cobarg, Erich Fenner, Max Guntersdorfer,
Walter Heywang, Franz Otto,
Rudolph Schoefer & Heimut Thomann.

BY _____ ATTYS.

INVENTORS
Christian Cobarg, Erich Fenner, Max Guntersdorfer,
Walter Heywang, Franz Otto,
Rudolph Schoefer & Helmut Thomann.

PIEZO ELECTRIC MOTOR

CROSS REFERENCE TO RELATED APPLICATIONS

This invention is not believed to be related to any applications of one or more of the applicants.

BACKGROUND OF THE INVENTION

1. Field of the Invention

This invention relates to that field of motor driven devices which requires the reciprocating movement through a short stroke of a member of low mass. Typically, and by way of example, it relates to a relatively low cost, light weight drive for a razor where the cutting member is moved back and forth in an oscillatory manner over a relatively short distance. More particularly, the present invention finds great use where it is embodied as a drive for appliances which require a relatively small mechanical output such, for example, as below 10 watts but preferably greater than 0.2 watts.

2. Description of the Prior Art

Applicants are not aware of any prior art which is particularly related to the present invention, the closest in applicants' opinion being the provision of a bell where the bell hammer is driven by a piezo electric bending vibrator. It is also known in the prior art to have a clock driven by a piezo-electrically actuated tuning fork.

SUMMARY OF THE INVENTION

The present invention is characterized by the fact that several piezo-electrically energizable bending strips are provided in the form of a unit which is mechanically mounted in parallel between a stationary bed and the part to be moved, and which are individually electrically energized by a suitable source of alternating current, such for example, as from a 110 to 125 volt A.C. power line. Where the power line is 220 to 250 volts, the bending strips are electronically arranged in pairs and serially connected so that the voltage drop across each individual strip is 110 to 125 volts. The piezo electric bending strips in a preferred embodiment of the present invention are in the form of a bronze strip carrying on both surfaces thereof a piezo electric ceramic such, for example, as lead zirconate-titanate or other ceramic of similar high coupling factor. It is also preferable that the ceramic have a high dielectric constant. A piezo electric strip of this design offers the advantage that the neutral zone where considerable shearing forces occur is free both from piezo electric ceramic and from connective means.

The present invention includes the provision of an electric motor that comprises several piezo-electrically energizable bending strips formed as a package, mechanically connected to each other in parallel, and arranged between the stationary part of the motor and a part to be moved.

In accordance with the present invention the bending strips are formed to include piezo electric ceramic, and which are, as a result of permanent electrical polarization, able to execute bending movements at corresponding electrical excitation. Preferably such bending strips are provided for the motor where each metal strip is firmly coated on both sides with strips of piezo ceramics. This design offers the advantage that the neutral zone where considerable shearing forces occur is free both from piezo electric ceramic material and also free from any connective means.

The bending strips for the invention are so designed and so excited that during one phase of the alternating excitation they are subjected to a curve with signs remaining unchanged over at least a major part of the length of the bending strips or in a particularly preferred embodiment, the sign of the curvature of the strip changes preferably at the place of half length, i.e., there is an S-like flexure with a turning point.

BRIEF DESCRIPTION OF THE DRAWINGS

FIG. 1 is a diagrammatic representation of a preferred embodiment of the present invention including a mounting frame or bed, a plurality or parallel mounted piezo electric bending strips, and a driven member;

FIG. 2 is an enlarged fragmentary view of a manner in which a bending strip may be mounted to the frame or bed;

FIG. 3 shows a variation of the mounting means shown in FIG. 2;

FIG. 4 is a view similar to FIG. 1, but shows a different embodiment of the present invention;

FIG. 5 is a diagrammatic view illustrating the forces set up in one of the bending strips of FIG. 4; and FIG. 6 is a schematic view similar to FIG. 1 but showing a still different embodiment of the present invention.

DESCRIPTION OF THE PREFERRED EMBODIMENTS

Referring now to the drawings, FIG. 1 shows the structure of a piezo electric motor which is arranged to drive an element 1 in an oscillatory manner. The actuating part of the motor includes a bank of parallel mounted bending strips 2 which are secured at one end to the driven part 1 and at the other end in a relatively fixed position to a mounting frame 4. It is to be understood that the oscillating movement of the driven member 1 is a back and forth movement in the directions indicated by the double arrow 3.

Each of the bending strips 2 comprise a metal strip 5 preferably of bronze, which is coated on both sides with ceramic strips 6. These ceramic strips 6 are of substantially identical thickness. In the form of the invention shown in FIG. 1, the metal strip is essentially in the area of the neutral axis of the bending strip in the piezo electric ceramic. Metal electrodes 7 are applied to the ceramic strips 6 and are just thick enough as to provide adequate conductivity. These electrodes 7 are arranged to be connected with electric connective wires (not shown).

While the metal strips 5 have been indicated above as being preferably formed of bronze, it may be replaced with strips of synthetic material approximately comparable with metal, but which are formed of a material such as hard paper or polyester reinforced with glass fiber.

The ceramic strips 6 are preferably pasted to a metal or plastic strip. It is recommended to metalize the ceramic on the side facing of the metal or plastic strip, particularly by vaporization, with a layer 8 so that an electric contact is created directly with the ceramic, that is without interposition of the adhesive layer. In order to establish an electric contact with the metal strip, an electrically conductive adhesive is provided at least at one point of the adhesive connection.

The bending strips 2 are firmly clamped into the body 4 or connected in a substantially fixed mechanical manner with the body 4 by means of a synthetic. It is important, according to the invention, that both the central metal strip 5 and the ceramic strips 6 be clamped in. This causes, as large and as strong as possible, a bending of the strip due to the piezo electric forces and that also at the clamping location in the body 4.

Figure 2:
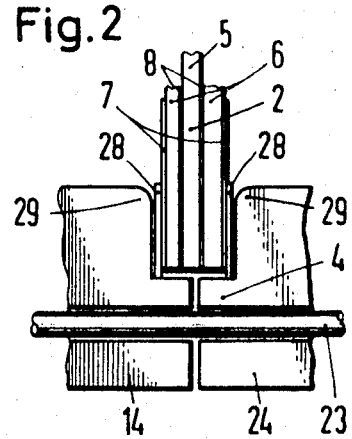

In order to prevent any damage to the ceramic parts of the bending strip, it is desirable to have a mounting structure such as that shown in FIG. 2. Here the body 4 includes a number of individual clamping jaws, 14, 24, corresponding to the number of bending strips 5, which are held together firmly by a bolt 23. A recess is provided for the accommodation of the bending strip in the area of the separation gap between adjacent clamping jaws 14 and 24. Which is so dimensioned that the bending strip 5 and two additional elastic plastic intermediate strips 28 may be placed between the confronting jaws. This enables each bending strip to be clamped firmly but not completely unelastically. This tends to prevent breakage at the point where the bending strips are clamped into the frame 4. The strips 28 may be formed, for example, of polytetrafluoroethylene with a thickness of about 0.1 mm. A further provision is made to eliminate breakage at the clamping point at the upper edge of the clamping jaws 14 and 24. As shown in FIG. 2, the upper corners are rounded. One preferred form of material for the body 4 and the clamping jaws 14, 24, etc. is polyacrylate glass.

Figure 3:
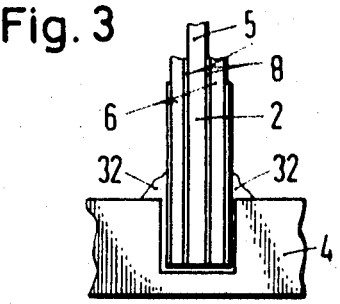

A modified form of mounting for the bending strips 2 is shown in FIG. 3. Here a recess is provided in the frame member 4, the bending strip then placed in desired position, followed by pouring in a castable resin 31. This castable resin should be not completely inelastic, but should be sufficiently stiff to firmly hold the lower ends of the bendable strips 2. If the body 4 is made of a not completely non-elastic material, it is advantageous to make the entire body from the cast resin in one operation by inserting the bending strips at the time the body 4 and the region 31 is being cast. This will eliminate the production of a special recess. Preferably, a bead 32 of cast resin is provided on the surface of the body 4, which, in its mechanical effect, substantially corresponds to the rounding 29 of the form of structure shown in FIG. 2.

The fastening of the upper ends of the bending strip 2 to the driven member 1 depends upon the function of the selection of the bending shape of the strips, namely whether these are to be with or without a turning point of curvature. Where the bending of a strip is without a turning point, the change of direction of the tangent of the bending strip at its upper end must be taken into consideration to determine what kind of fastening is to be employed. Only the metal strip is preferred there for that reason, and is fastened in the manner shown in FIG. 1, which then upon firm clamping at this point, undergoes, in operation, a stronger curving in each case opposite that of the bending strip. Strictly speaking, a turning point exists here also, but at the end of the strip and outside of piezo ceramic. Under the concept of the present invention it is possible to interchange the prevailing kind of fastening of the strips at the body part 4 and the driven part 1.

Figure 4:
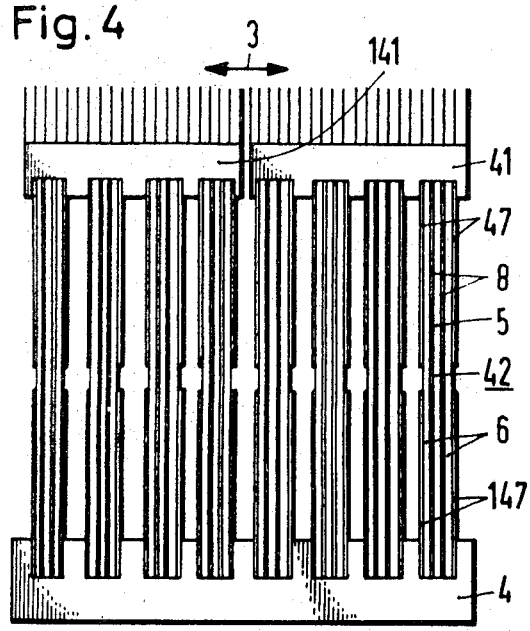

FIG. 4 shows an embodiment of the piezo electric motor according to the present invention equipped with bending strips 42, whose curvatures show in operation a turning point at about mid-length of the strip. It is advantageous in this case to firmly clamp in the bending strips not only in the body 4 but also at the other end of the strips in driven members 41 and 141. For example, by clamping in or connecting the strips at this point including the ceramic 47 and 147 are electrodes as electrodes 7.

Figure 5:
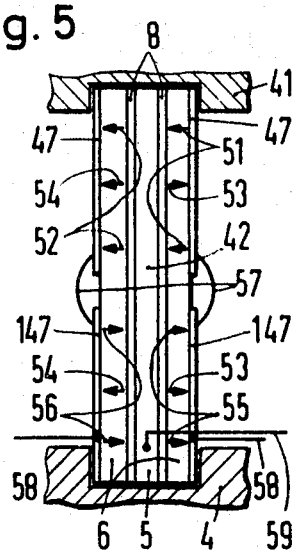

FIG. 5 shows an enlarged schematic view of one bending strip 42 with the thickness of the strips being greatly exaggerated with respect to their relative length. Some of the components of the form shown in FIG. 5 have been similarly numbered to those shown in FIGS. 1 and 4. In order that in the lower half of the bending strips the curvature may be obtained which during one phase of excitation is opposite to the curvature of the upper half, it is necessary to select the direction of the permanent polarisation of the ceramic in the lower half opposite to the direction of the polarisation of the ceramic in the upper half or to select the electrical excitation alternating voltage phase in the lower half opposite to the excitation voltage phase in the upper half of the bending strip for opposite stimulation. Either arrangement offers advantages. In the case of the form shown in FIG. 5, the polarizations 55 and 56 are selected in the lower half in opposite direction of the polarizations 51 and 52 in the upper half so that the stimulation in both halves may have in each case, uniform alignments 53 and 54. This selection offers the advantage that the electric coatings 47, 147 on each side of the bending strips can be electrically connected after polarization of the ceramic and this is schematically indicated by the connections 57 as shown in FIG. 5. Such connections are preferably realized by application of a conductive path on the ceramic. If a polarization which is all the way through for each ceramic strip is selected, the electrodes 47 and 147 remain separated from each other because of the opposite stimulation. In the area about the turning point, no stimulation is necessary in the ceramic. For that purpose the ceramic remains unpolarized there as indicated in FIG. 5 or the electrode coatings of the ceramic strips are eliminated there. Connecting wires for the electrodes are illustrated at 58 and 59 identifies an electric feed conduit applied at the outer side of the bending strip for a metalic strip 42. The electrical stimulation voltage for the individual strip is applied between 58 and 59.

Motors of the type herein described can be used advantageously in small appliances for cosmetic body care, such as electrically operated nail files, hair clippers, tooth brushes, and massaging apparatus. Driven member 1 is then designed specifically for such applications such, for example, as a file as shown in FIG. 1 or as a knife, brush or some other suitable light-weight driven member. In commercial engineering, for example, in communications and telephone technique, the application of motors are particularly advantageous wherever mechanical oscillatory movements are required. A motor of the type of the present invention is also particularly appropriate for the propulsion means in a dry shaver, and in such case, the driven member 1 is the cutting head.

The thickness of the ceramic coatings of strips 2 and 42 are selected particularly for the use in a motor used in miniature appliances which are adapted to be driven from a conventional electric supply line having 110 to 125 volts at 50 to 60 cycles. Where such devices are to be driven from a 220 to 250 A.C. supply line two, bending strips are connected electrically in series so that the voltage drop across each individual strip is still only 110 to 125 volts. The connection in series of two bending strips makes it possible to have a motor which may be adapted for use with either type of power line by simple switching for various line voltages.

Under the situation pointed out above, values between about 0.15 and 0.25 mm. and preferably 0.22 mm. have proved to be particularly suitable for the thickness dimension of the ceramic strips. It is desirable to have the metal strips 5 and 42 range between about 0.08 mm. and 0.15 mm., preferably 0.1 mm. The longitudinal dimensions of the bending strip are so selected in a motor for oscillatory movement according to the present invention that the strips together with the oscillating mass to be moved have a basic resonance frequency which is higher preferably by the factor of 1.5 to 2 than the operating line frequency of 50 to 60 cycles from which the motor is to be driven. With a structure of the type herein described, substantially identical high performance capabilities are obtained with either 50 to 60 cycle power supply.

FIG. 4 shows, in addition to the clamping at both ends as hereinabove described, certain individual features which cause the motor to operate at particularly low vibration. Parts 41 and 141 along with their respective associated bending strips 42 are tuned with respect to their masses in such a way that practically no noticeable resulting forces occur.

Figure 6:
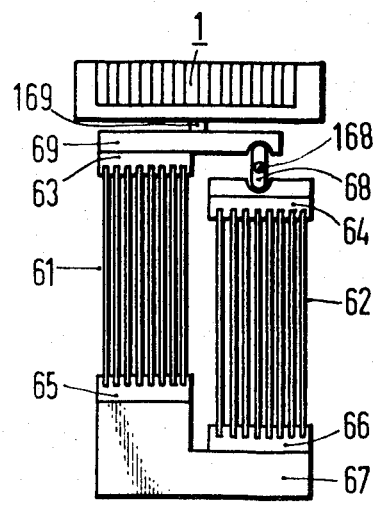

FIG. 6 shows a piezo electric motor embodying a different form of the present invention. The motor of FIG. 6 like that of FIG. 4 has bending strips divided into two bending vibrator packages 61 and 62. The bending vibrator packages are clamped bilaterally into the rails 63, 64, 65 and 66, are located on a base plate at different heights so that at equal lengths of their bending vibrators, the transmission member 68 can be accommodated. This transmission member 68 couples the bending vibrator package 62 with the coupling bar 69 attached to the bending vibrator package 61, said coupling bar in turn being coupled by a transmission member 169 to the driven member 1. The transmission means is a two-arm lever pivotable about a shaft 168 and used to reverse the direction of motion of the driven part of the oscillating package 62 oscillating in a direction opposite to that of the oscillation package 61. The shaft 168 is positioned in a fork (not shown) placed on the base plate 67.

With such an arrangement, vibration oscillations can also be compensated effectively while the driven member which is to be driven, moves reciprocally. Both masses 61 and 1 oscillating in opposite directions on the one hand, and 62 on the other hand can be made equally large by means of varying the thickness of the individual packages of the bending oscillator packages and/or by a compensation weight at the upper rail 64 of the oscillator package 62.

In the embodiment shown in FIG. 4, the parts 41 and 141 are particularly designed for driving the shaving head of a dry razor. The reciprocating distance of these shaving heads is selected large enough so that they move in opposite directions and barely touch each other. If necessary, a thin plastic body (not shown) is also provided for the non-elastic absorption of thrust energy between 41 and 141. The embodiment with two cutting heads also can be used in an oscillating motor with other types of fastening of the bending strips, as shown in FIG. 1.

In order to provide the shearing blade of a razor with adequate support in the interstice area between both shaving heads, pin or rib-like extensions may be provided at the sides of the parts on 41 and 141 facing each other. These extensions are arranged at both heads staggered against each other so that they intermesh the gaps. They themselves have a length which is so large that at maximum oscillatory distance of the shaving heads from each other, they just slightly intermesh. The surface of the extensions facing the shearing blade is so designed that the extensions protect the shearing blade in operation against sagging.

The parts 41 and 141 also may be interposed instead of being arranged one behind the other in a shaft.

If necessary for the composition of the masses, three or more parts such as 1, 41, and 141 may be provided. A preferred form of piezo electric ceramic is lead zirconate-titanate or a ceramic with a similar high coupling factor. It is also desirable that the ceramic have a relatively high dielectric constant.

Although the invention has been described in connection with the preferred embodiments, it is not to be so limited as changes and modifications may be made which are within the full intended scope of the invention as defined by the appended claims.

We claim as our invention:

1. A piezo electric motor for generating substantially rectilinear stroke movements of a first driven member comprising:
    a base member;
    a member to be driven;
    a plurality of piezo electric bending strips arranged in two packages with their respective strips substantially parallel to each other;
    means securing said packages of strips to said base member with one package offset longitudinally with respect to the other, whereby one package of bending strips extends out beyond the other package;
    an intermediate coupling bar;
    a transmission member connecting said intermediate coupling bar to said member to be driven;
    the ends of said bending strips remote from said base member of said one of said packages being secured to one end of said coupling bar;
    a second driven member;
    the ends of said remaining bending strips being connected to said second driven member;
    a support pin carried by said base member; and
    a rockable arm pivoted at its center on said pin and having its opposite ends rockably engaged by said intermediate coupling bar and said second driven member.

2. A piezo electric motor according to claim 1, in which said piezo electric bending strips are energized by an alternating electric voltage, and in which the resonant frequency of mechanical oscillation of the moving parts is 1.5 to 2.0 times the frequency of said alternating electric voltage.

3. A piezo electric motor according to claim 1 in which said piezo electric bending strips are energized by an alternating electric voltage, and in which the resonant frequency of mechanical oscillation of the moving parts is substantially higher than the frequency of said alternating electric voltage.

4. A piezo electric motor for generating substantially rectilinear stroke movements of a first driven member comprising:
- a base member;
- a first driven member;
- a plurality of piezo electric bending strips arranged in two packages with their respective strips substantially parallel to each other;
- means securing said packages of strips to said base member with one package offset longitudinally with respect to the other, whereby one package of bending strips extend out beyond the other package;
- an intermediate coupling bar;
- the ends of said bending strips remote from said base member of said one of said packages being secured to said coupling bar;
- a second driven member;
- the ends of said remaining bending strips being connected to said second driven member;
- a support pin carried by said base member;
- a rockable arm pivoted at its center to said pin and having its opposite ends rockably engaged by said coupling bar and said second driven member;
- said second driven member being coupled to said first driven member through said rockable arm and said intermediate coupling bar, and
- whereas said first driven member is connected to the coupling bar at a side facing away from the base member.

* * * * *